US006817455B1

(12) United States Patent
Gazyakan et al.

(10) Patent No.: US 6,817,455 B1
(45) Date of Patent: Nov. 16, 2004

(54) RETARDER SYSTEM

(75) Inventors: Ünal Gazyakan, Friedrichshafen (DE); Detlef Baasch, Friedrichshafen (DE); Roland Altvater, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/111,182

(22) PCT Filed: Oct. 23, 2000

(86) PCT No.: PCT/EP00/10410

§ 371 (c)(1), (2), (4) Date: Apr. 18, 2002

(87) PCT Pub. No.: WO01/31220

PCT Pub. Date: May 3, 2001

(30) Foreign Application Priority Data

Oct. 27, 1999 (DE) ......................................... 199 51 735

(51) Int. Cl.[7] ............................................. F16D 57/00
(52) U.S. Cl. ....................................................... 188/290
(58) Field of Search ................................ 188/290, 291, 188/293, 294, 296

(56) References Cited

U.S. PATENT DOCUMENTS

| 3,989,127 | A | * | 11/1976 | Staudenmaier et al. | ..... 188/296 |
| 4,169,414 | A | * | 10/1979 | Muller | .......................... 105/61 |
| 4,321,793 | A | * | 3/1982 | Uranaka et al. | .............. 60/358 |
| 4,699,022 | A | * | 10/1987 | Stadt et al. | ..................... 477/59 |
| 5,358,081 | A | | 10/1994 | Kaneda et al. | .............. 188/291 |
| 6,561,324 | B2 | * | 5/2003 | Friedrich et al. | ............. 188/296 |

FOREIGN PATENT DOCUMENTS

| DE | 25 18 103 | 11/1976 | |
| DE | 34 30 456 A1 | 10/1985 | ........... F16N/39/02 |
| DE | 43 20 695 A1 | 12/1993 | ........... B60T/10/02 |
| DE | 196 41 558 A1 | 4/1998 | ........... B60K/11/02 |
| DE | 196 46 598 A1 | 5/1998 | ........... B60T/1/087 |
| DE | 197 51 776 A1 | 5/1999 | ........... B60T/10/00 |
| DE | 199 34 621 A1 | 1/2001 | ........... B60T/10/02 |
| GB | 1 394 450 | 5/1975 | ............ F01M/5/00 |
| JP | 10-15780 | 6/1998 | ........... B60T/1/087 |

OTHER PUBLICATIONS

"Taschenbuch für den Maschinebau", Edition 4, pp. R49–R53.

Schwab, Manfred, Wilhelm Härdtle and Karl–Fritz Heinzelmann, Ein Integrierter hydrodynamischer, Retarder für die neue Ecosplit–Getriebereihe, *ATZ Automobiltechnische Zeitschrift*, vol. 95, No. 5, May 1, 1993, pp. 250–255.

\* cited by examiner

*Primary Examiner*—Jack Lavinder
*Assistant Examiner*—Thomas Williams
(74) *Attorney, Agent, or Firm*—Davis & Bejold, P.L.L.C.

(57) ABSTRACT

A retarder system for commercial vehicles is provided which consists of a transmission oil circuit (18) for lubrication of the transmission and of a retarder cooling circuit (4) which uses oil as operating fluid, both circuits being coupled via a connection (21) so that in the non-activated braking state of the retarder (1), for increasing the transmission oil flow rate through a radiator (3), oil can be branched off from the transmission oil circuit (18). In addition a retarder pump (12) is proposed which has a prime mover (25), preferably an electrical motor.

8 Claims, 2 Drawing Sheets

RETARDER SYSTEM

FIELD OF THE INVENTION

The invention relates to a retarder system.

BACKGROUND OF THE INVENTION

Hydrodynamic retarders have become known, for example, from the German publication. Dubbel, "Taschenbuch für den Maschinenbau", 18$^{th}$ edition, pages R49–R53. Those retarders are connected and disconnected by filling and emptying with an operating fluid a bladed working cycle.

Mainly commercial vehicles have a hydrodynamic retarder with a retarder coolant circuit. Even though said retarder coolant circuit is designed separate from the transmission oil circuit proper, it uses as a rule the transmission oil from the transmission sump as operating fluid.

Retarders are often used as wear-resistant continuously operating brakes which are provided with a rotor unit connectable with the transmission of the vehicle and for decelerating the vehicle converts the mechanical energy of the transmission to thermal energy. It is, therefore, obvious to use the transmission oil as operating fluid of the retarder.

In DE 197 51 776 A1 and DE 196 46 598 A1, for example, hydrodynamic retarders of that kind have been disclosed in which the rotor converts the mechanical energy to the energy of a fluid which for its part is changed to heat in the rotor unit whereby the desired braking power is produced.

Hydrodynamic retarders can be either coupled to the transmission to be decelerated or already integrated in it. In a common arrangement of the hydrodynamic retarder this is integrated in a transmission, preferably of commercial vehicles, and driven by a drive shaft of the transmission, the operating fluid constituting, as already mentioned, oil from a transmission sump which simultaneously feeds a separate transmission oil circuit.

In construction and operation a retarder is similar to a hydrodynamic converter which is used in opposite working direction. The hydrodynamic retarders, already known, are usually designed with a rotor unit and a stator unit, the rotor unit being designed with a rotor shaft and a rotor impeller which interacts with a stator impeller disposed spaced from the rotor impeller.

The rotor unit of the retarder is here connected with the drive shaft of the transmission while the stator unit is fixedly situated on a retarder or transmission housing. As a consequence of the loading with a torque from the rotor unit, the operating fluid located between rotor impeller and stator impeller is driven and circulated by the rotor unit, similarly as in a pump, in the working cycle of the retarder. The hydraulic flow resistance of operation fluid is braking the output shaft of the transmission, a certain differential rotational speed having always to be maintained.

The kinetic energy consumed as result of the delay or of the deceleration of the rotor results in a heating of the transmission oil. To prevent an overheating respectively of the retarder or of the oil, the heated transmission oil has to be cooled off in an adequate manner when passing through a radiator.

To eliminate the heat produced in the retarder, a retarder coolant circuit is usually provided which comprises the retarder with the stator unit and the rotor unit thereof and the radiator. In the activated state of the retarder, said retarder coolant circuit is closed as intrinsic working cycle of the retarder, there being conveyed, via a control valve and a retarder pump, operating fluid which has been lost due to inner leakage in order to maintain the filling level in the system. In a deactivated state of the retarder, the transmission oil is delivered through the radiator by the retarder pump according to the rotational speed of the transmission and thus to the velocity of the vehicle while circumventing the rotor and stator units of the retarder, and then returned to the transmission sump. The radiator in the coolant circuit of the retarder is a heat exchanger known per se which can communicate with a cooling water system of the motor.

At a low speed of the vehicle, a correspondingly small amount of transmission oil is passed through the heat exchanger. Since the degree of cooling power essentially depends on the flow rate, the cooling of the transmission oil is in those cases rather ineffective and the radiator is marked by a poor degree of efficiency.

In addition in certain driving situations, there exist specific load conditions which require an increased flow rate of transmission oil through the radiator. Here is to be mentioned such a driving situation in which a high working capacity with simultaneous low velocity occurs as is the case, for example, in mountain driving of a commercial vehicle under full load. It is problematic here that in accordance with the low velocity of the vehicle, the transmission pump makes available to the radiator only a correspondingly low amount of oil and the cooling power needed for this case of load can only be attained by a considerably larger amount of oil. The degree of efficiency of the radiator is also low in this case.

SUMMARY OF THE INVENTION

The problem on which this invention is based is to provide a retarder system in which with simple means the flow rate of transmission oil through a radiator of a retarder can be optionally increased in certain driving situations that occur for the purpose of obtaining better cooling power.

The heat exchanger of the retarder coolant circuit is basically laid out for a multiplicity of flow rates of transmission oil that the retarder pump can make available, as this must always be the case, for example, for the braking state of the retarder, that is, in its closed working cycle. Consequently an exiting amount of transmission oil exceeding the amount normally flowing through the radiator depending on the prevalent velocity can always be easily absorbed by the radiator.

According to the invention the flow rate can be optionally increased without this exclusively depending on the actual velocity of the vehicle. According to the invention this is possible for a low velocity of the vehicle both under normal load and under full load or overload like, for example, in a mountain drive.

The better cooling power that goes along with an increased flow rate lowers the maximum temperature of the transmission oil occurring during the cooling operation whereby the service life of this operating fluid is decisively extended. Besides, the degree of efficiency of the heat exchanger used increases. With an altogether better cooling behavior is also associated a subsequent re-regulation of the retarder.

BRIEF DESCRIPTION OF THE DRAWINGS

The invention will now be described, by way of example, with reference to the accompanying drawings in which.

DETAILED DESCRIPTION OF THE INVENTION

Figure 1:
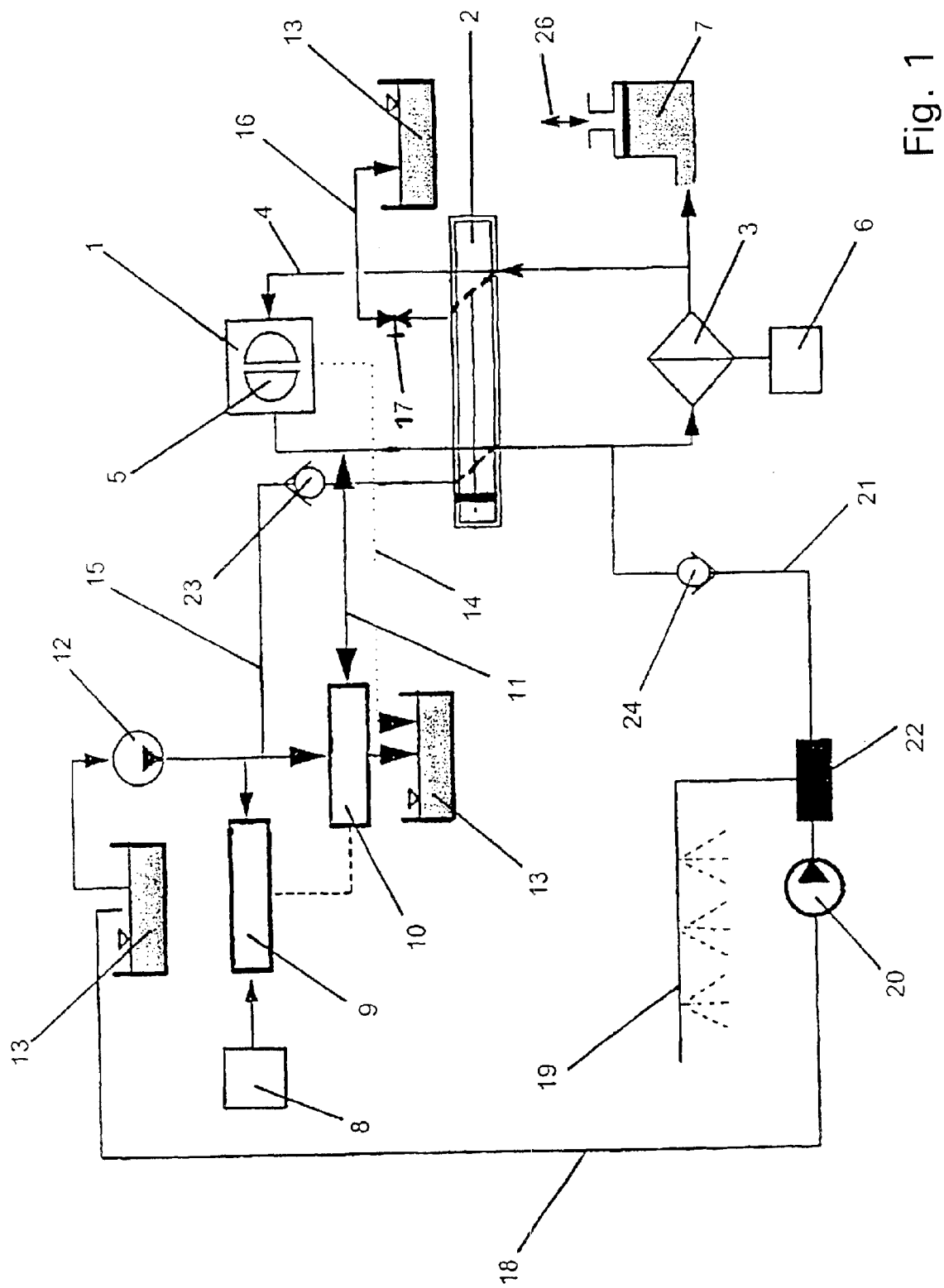
FIG. 1 is a diagrammatic view of an inventive retarder system which can be connected with a transmission oil circuit.

Referring to FIG. 1, it diagrammatically shows a retarder 1 with the appertaining circuits which is integrated in a transmission, not shown in further detail, of a commercial vehicle.

The retarder 1 in the brake activated state, that is, in a deceleration action upon the transmission, is connected via a switch valve 2 with a radiator 3 that constitutes a heat exchanger whereby a closed working cycle or retarder coolant circuit 4 forms. In this closed working cycle 4, the transmission oil circulates as operating fluid as result of the torque applied by a rotor 5 of the retarder 1 when the transmission is decelerated. In the radiator 3, which is connected with a symbolically shown motor cooling system 6, the transmission oil heated by the retarder 1 is cooled off while the heat is radiated to a motor cooling water.

The retarder 1, in a non-activated state, is emptied of transmission oil. In order to be able to start up, a specific starting amount of transmission oil is needed which is briefly made available by an oil accumulator 7 after the switch valve 2 closes the working cycle 4. When the retarder 1 is activated, the oil accumulator 7 is actuated by the driver by means of a compressed air device 26 only indicated here, the needed amount of transmission oil being pumped into the working cycle 4 so that the retarder 1 can start up.

The braking power of the retarder 1 depends essentially on the amount of transmission oil available in the retarder 1 or in the working cycle 4. The braking power is selected by the driver via a brake stepped selection 8 with a stepped regulation. To this end is provided a control valve 9 which is connected with the brake stepped selection 8 and, in turn, acts upon a regulating valve 10. Said regulating valve 10 communicates on one side, via a feed line 11, with the working cycle 4 and on the other side, via a retarder pump 12, with a transmission sump 13. The amount of transmission oil corresponding to one selected braking step and thus to a certain braking power is delivered by the retarder pump 12 out of the transmission sump 13 and supplied via the regulating valve 10 to the working cycle 4. The retarder pump 12 is connected with the output of the transmission so that the delivery work takes place in accordance with the rotational speed of the transmission and thus with the velocity of the commercial vehicle.

During the braking operation of the retarder 1, the retarder pump 12 and the regulating valve 10 constantly feed a certain amount of transmission oil to the working cycle 4 in order to balance the leakage losses occurring in the retarder 1 and returned by inner leakage (graphically shown by line 14) to the transmission sump 13.

When the retarder 1 is in a non-activated braking state, the switch valve 2, as diagrammatically shown with dotted lines in FIG. 1, is shifted so that the radiator 3 communicates, via a feed line 15, directly with the retarder pump 12 and the transmission sump 13. After the radiator 3, the transmission oil delivered by the retarder pump 12 is again returned to the transmission sump 13, via the exhaust line 16. The exhaust line 16 has a pressure retaining valve 17 in order to maintain (relative to the radiator 3) a specific counter-pressure for purposes of an adequate operation.

In addition, a transmission oil circuit 18 branches off from the transmission sump 13 by which the transmission oil arrives at a symbolically shown transmission lubrication device 19. The amount of transmission oil needed for lubrication of the transmission is made available by a transmission pump 20 in the manner of oil delivery pumps known per se. During normal operation, the transmission pump 20 works according to the rotational speed of the transmission.

According to the invention, a connection 21 is provided from the transmission oil circuit 18 to the retarder coolant circuit 4 so that, in addition to the amount delivered by the retarder pump 12, additional transmission oil can be supplied from the transmission oil circuit 18 to the radiator 3 while increasing the cooling power. Since the retarder 1 is not activated for braking, the retarder coolant circuit 4 is here located in an open position, that is, the retarder 1 is circumvented.

The branching off of the amount of transmission oil needed for lubrication of the transmission, on one hand, and the relay of added transmission oil to the retarder coolant circuit 4, on the other, are ensured according to the invention by a distributor block 22 which can have several valves of conventional design. The distributor block 22 or the valves thereof are electronically controllable, their opening behavior resulting according to the oil temperature and to the load state of the transmission.

The connection 21, the same as the feed line 15 of the retarder coolant circuit 4, have respective recoil (one way) valves 23 and 24 which prevent a return of transmission oil in a direction opposite to the delivery direction of the transmission oil.

Figure 2:
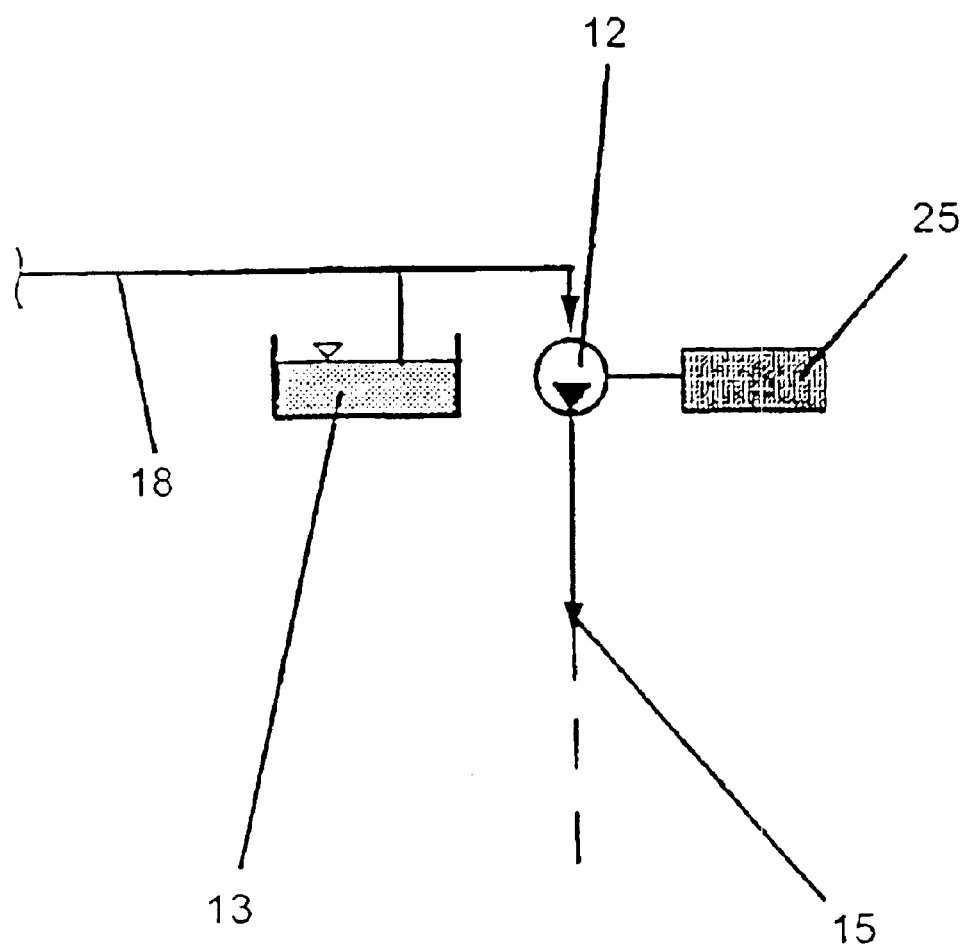
FIG. 2 is a diagrammatic view of a retarder pump according to the invention.

FIG. 2 shows diagrammatically and only in section one other embodiment of the invention.

The desired increase of the flow rate of transmission oil through the radiator 3 can also be implemented by coupling the retarder pump 12 with a prime mover 25, usually electrical and located outside the transmission, which preferably can be electronically controlled. The retarder pump 12, which otherwise is coupled to the transmission depending on the output rotational speed is, according to this embodiment, uncoupled from the transmission and driven by the electrical motor 25 so that independent of the output rotational speed of the transmission, an altogether higher delivery rate can be obtained. The transmission oil thus delivered out of the transmission sump 13 is supplied to the switch valve 2 and the radiator 3, via the feed line 15, and returned from the radiator 3, via the exhaust line 16 and the pressure-retaining valve 17, again supplied to the transmission sump 13 and always circumventing the retarder 1.

Both embodiments of the invention, that is, the connection 21 of the transmission oil circuit 18 with the retarder coolant circuit 4 and the coupling of the retarder pump 12 with the additional prime mover 25, can obviously be combined in one whole system.

In all embodiments the control or regulation of the transmission pump 20, of the distributor block 22 or the valves contained therein and of the retarder pump 12 with the prime mover 25 is ideally connected with an electronic transmission control and laid out according to parameters, specially according to load and/or temperature.

What is claimed is:

1. A retarder system for a motor vehicle having a retarder coolant circuit (4) comprising:
   a retarder (1);
   a radiator (3);
   a retarder pump (12) for supplying transmission oil from a transmission sump (13) to the radiator (3);
   at least one of a control valve (9) and a regulating valve (10) for regulating flow of transmission oil required by the retarder (1) as an operating fluid when preforming required braking; and a switch valve (2), when in a first position in which the retarder (1) is in an inactive state, connecting the retarder pump (12) with the radiator (3) so that the transmission oil, supplied from the transmission sump (13), is returned to the transmission sump (13) via the radiator (3) without passing through the retarder (1) and the switch valve (2), when in a second position in which the retarder (1) is in an active state, connecting the radiator (3) with the retarder (1) for forming a closed loop cooling circuit (4);

wherein a transmission oil circuit (18) has a transmission pump (20) for supplying transmission oil from the transmission sump (13) to at least one other component of the transmission for lubrication thereof, and the transmission oil circuit (18) has a connection (21) with the retarder cooling circuit (4) such that transmission oil can be branched off from the transmission oil circuit (18) for increasing the flow rate of transmission oil through the radiator (3); and a one way valve (23) is provided along the transmission oil flow path, between the retarder pump (12) and the retarder cooling circuit (4), to prevent transmission oil from flowing back toward the transmission sump (13), and a one way valve (24) is provided along the transmission oil flow path, between the transmission pump (20) and the retarder cooling circuit (4), to prevent transmission oil from flowing back toward the transmission sump (13).

2. The retarder system according to claim 1, wherein a flow rate of transmission oil supplied by the retarder pump (12) is dependent upon the velocity of the vehicle and a flow rate of transmission oil supplied by the transmission pump (20) is dependent upon the rotational speed of the transmission.

3. A retarder system for a motor vehicle having a retarder coolant circuit (4) comprising:

a retarder (1);

a radiator (3);

a retarder pump (12) for supplying transmission oil from a transmission sump (13) to the radiator (3);

at least one of a control valve (9) and a regulating valve (10) for regulating flow of transmission oil required by the retarder (1) as an operating fluid when preforming required braking; and a switch valve (2), when in a first position in which the retarder (1) is in an inactive state, connecting the retarder pump (12) with the radiator (3) so that the transmission oil, supplied from the transmission sump (13), is returned to the transmission sump (13) via the radiator (3) without passing through the retarder (1) and the switch valve (2), when in a second position in which the retarder (1) is in an active state, connecting the radiator (3) with the retarder (1) for forming a closed loop cooling circuit (4);

wherein a transmission oil circuit (18) has a transmission pump (20) for supplying transmission oil from the transmission sump (13) to at least one other component of the transmission for lubrication thereof, and the transmission oil circuit (18) has a connection (21) with the retarder cooling circuit (4) such that, when the retarder (1) is in the inactive state, transmission oil can be branched off from the transmission oil circuit (18) for increasing the flow rate of transmission oil through the radiator (3); and the transmission oil circuit (18) has a distributor block (22) which regulates the supply of transmission oil to the transmission and to the radiator (3).

4. The retarder system according to claim 3, wherein the distributor block (22) is electronically controlled by the retarder system according to at least one of load, a temperature and a velocity.

5. The retarder system according to claim 3, wherein a flow rate of transmission oil supplied by the retarder pump (12) is dependent upon the velocity of the vehicle and a flow rate of transmission oil supplied by the transmission pump (20) is dependent upon the rotational speed of the transmission.

6. A retarder system for a motor vehicle having a retarder coolant circuit (4) comprising:

a retarder (1);

a radiator (3);

a retarder pump (12) for supplying transmission oil from a transmission sump (13) to the radiator (3);

at least one of a control valve (9) and a regulating valve (10) for regulating flow of transmission oil required by the retarder (1) as an operating fluid when preforming required braking; and a switch valve (2), when in a first position in which the retarder (1) is in an inactive state, connecting the retarder pump (12) with the radiator (3) so that the transmission oil, supplied from the transmission sump (13), is returned to the transmission sump (13) via the radiator (3) without passing through the retarder (1) and the switch valve (2), when in a second position in which the retarder (1) is in an active state, connecting the radiator (3) with the retarder (1) for forming a closed loop cooling circuit (4);

wherein a transmission oil circuit (18) has a transmission pump (20) for supplying transmission oil from the transmission sump (13) to at least one other component of the transmission for lubrication thereof, and the transmission oil circuit (18) has a connection (21) with the retarder cooling circuit (4) such that, when the retarder (1) is in the inactive state, transmission oil can be branched off from the transmission oil circuit (18) for increasing the flow rate of transmission oil through the radiator (3); and the retarder pump (12) is coupled with a prime mover (25) so as to be controlled independently of a velocity of the vehicle.

7. The retarder system according to claim 6, wherein the prime mover is an electrical motor (25).

8. The retarder system according to claim 6, wherein the prime mover (25) is electronically controlled in accordance with an actual operating condition.

* * * * *